United States Patent
Lee

(10) Patent No.: US 10,967,928 B1
(45) Date of Patent: Apr. 6, 2021

(54) SEATING APPARATUS

(71) Applicant: Yongwoo Calvin Lee, Los Angeles, CA (US)

(72) Inventor: Yongwoo Calvin Lee, Los Angeles, CA (US)

( * ) Notice: Subject to any disclaimer, the term of this patent is extended or adjusted under 35 U.S.C. 154(b) by 0 days.

(21) Appl. No.: 16/698,799

(22) Filed: Nov. 27, 2019

(51) Int. Cl.
  *B62J 1/04* (2006.01)
  *B62J 1/18* (2006.01)
  *B62J 1/00* (2006.01)

(52) U.S. Cl.
  CPC ............... *B62J 1/04* (2013.01); *B62J 1/005* (2013.01); *B62J 1/18* (2013.01)

(58) Field of Classification Search
  CPC ............... B62J 1/04; B62J 1/005; B62J 1/18
  USPC ................................... 297/201, 202, 208
  See application file for complete search history.

(56) References Cited

U.S. PATENT DOCUMENTS

| | | | | |
|---|---|---|---|---|
| 576,192 | A * | 2/1897 | Hoyt | B62J 1/005 297/201 |
| 618,240 | A * | 1/1899 | Smith | B62J 1/005 297/201 |
| 694,875 | A * | 3/1902 | Meighan | B62J 1/005 297/201 X |
| 6,554,355 | B2 | 4/2003 | Kaptur | |
| 6,786,542 | B1 * | 9/2004 | Nuzzarello | B62J 1/005 297/195.1 |
| 6,827,397 | B1 | 12/2004 | Driver | |
| 7,178,869 | B2 | 2/2007 | Ljubich | |
| 9,227,681 | B2 * | 1/2016 | Eldredge | B62J 1/04 |
| 9,821,867 | B2 | 11/2017 | Goff | |
| 2003/0067195 | A1 * | 4/2003 | Sylvester | B62J 1/04 1/4 X |
| 2006/0049611 | A1 | 3/2006 | Stevens | |

OTHER PUBLICATIONS

Name: All-Winds Saddle Taiwan https://www.amazon.com/All-wings-saddle-Taiwan-Mountain-Bicycle/dp/B07SMMX76C/ref=asc_df_B07SMMX76C/?tag=hyprod-20&linkCode=df0&hv%E2%80%A6.
Name: MAGO https://www.ergoprise.com/mogo-portable-seat-with-cushion/?gclid=CjwKCAjw8ZHsBRA6EiwA7hw_sfNDLU7pPNH38aBwKj2nnqCuMEAmR9irjHAZr8%E2%80%A6.

* cited by examiner

Primary Examiner — Anthony D Barfield
(74) Attorney, Agent, or Firm — John K. Park; Park Law Firm

(57) ABSTRACT

A seating apparatus may include a seating unit and a pair of hollow supporting structure. In one embodiment, the hollow supporting structure is bowl-shaped springs which can be disposed underneath a seating unit to receive and support the buttocks of the user. In another embodiment, the seating unit can include a regular seat, a stool, a bicycle seat, and even a horse saddle. More specifically, the buttocks of the user can be received in a concave surface of each bowl-shaped spring so a complete support over a large area is provided to the user's buttocks and pubic bone to eliminate the pressure therefrom. Furthermore, the springs can also be used as cushions to absorb impact on the user's lower body portion. In another aspect, the hollow supporting structure is a pair of rings, and in a further aspect, the hollow supporting structure is a pair of bowl-shaped units.

20 Claims, 8 Drawing Sheets

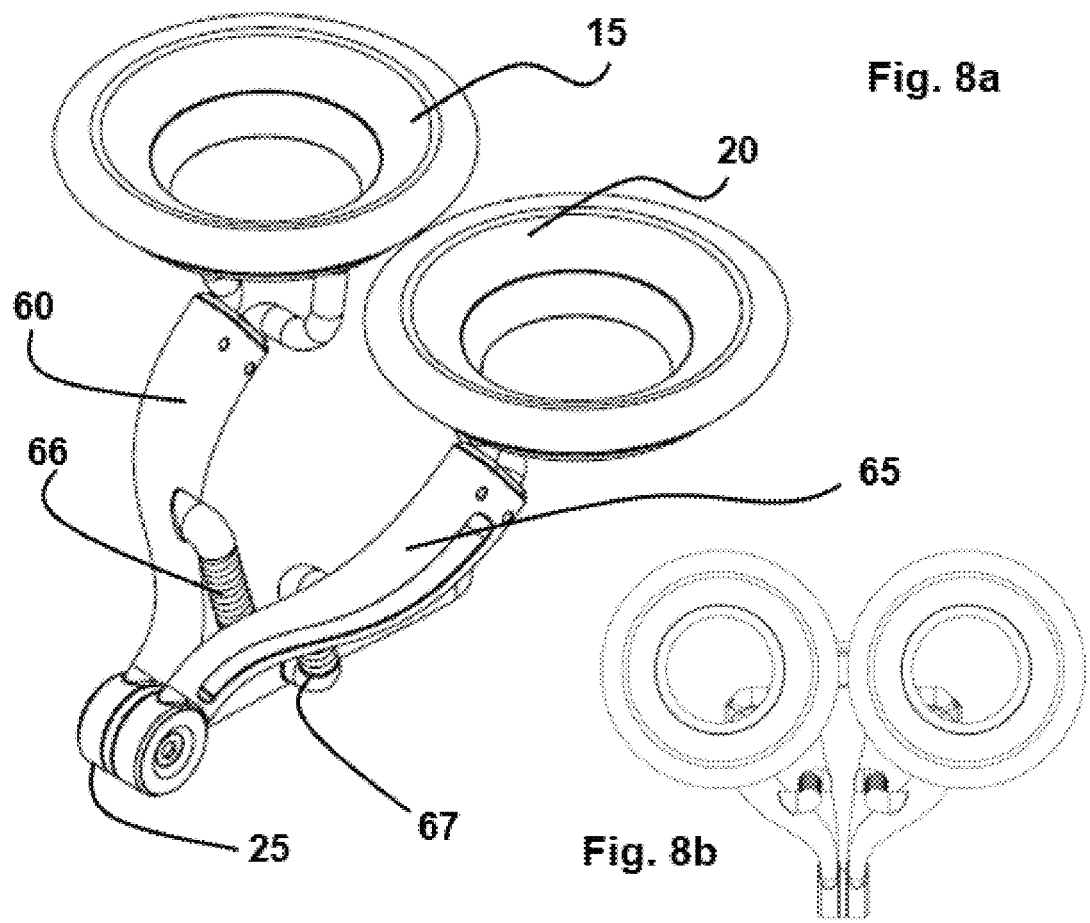
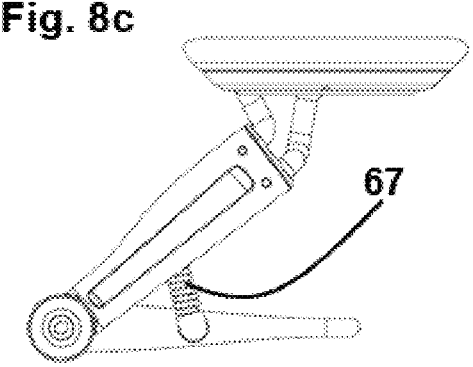
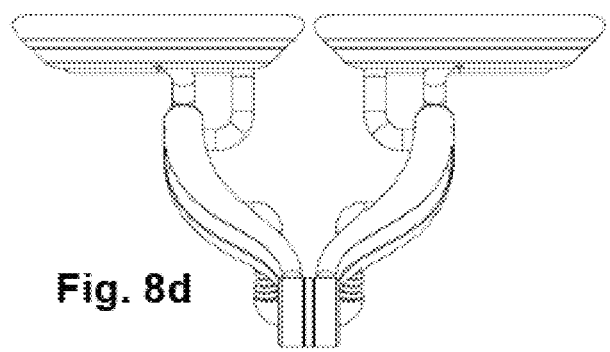

SEATING APPARATUS

RELATED FIELD

The present disclosure relates to a seating apparatus, and more particularly to a seating apparatus without creating pressure on the user's pubic arch bone.

BACKGROUND

Two-wheeled vehicles (e.g., bicycles and motorcycles; collectively referred to herein as cycles) have always utilized a seat for the rider to sit on during operation. Typical seats include a relatively narrow front portion (horn) and a relatively wide rear section. Such seats are straddled and sat upon by a rider such that the wider rear section supports the rider's buttocks, and the horn extends between the rider's legs under his/her crotch.

One problem associated with traditional cycle seats is the discomfort caused by pressure applied by the seat's horn on the rider's crotch. Depending on the orientation of the rider, the amount of pressure applied to the rider's crotch region can become significant, causing discomfort and, in extreme cases for male riders, can result in testicular damage and sterility.

FIG. 1 shows an anatomic view of a cyclist in a sitting position on a standard bicycle seat 6. Rather than sitting on a regular seating unit, the cyclist overlies his/her weight load largely on the on the ischial tuberosity 2 of the pelvic bone 1 on a limited area of the bicycle seat 6 of a bicycle. Namely, a considerable part of the body weight may apply to only two relatively narrow points on the buttocks 3, which may cause the consequences of bruising, skin irritation, circulatory disorders and pain near the buttocks 3, and the problem can be accentuated when cycling long distances, requiring the cyclist to be on the bike for extended periods.

To resolve the problems stated above, various seats with supporting apparatus to reduce the pubic/buttocks pressure have been developed. For example, U.S. Pat. Pub. No. 20060049611 to Stevens discloses an apparatus for mounting a bicycle in a manner which permits the removal of the body weight from the pubic area and reduces buttocks pressure while adding therapeutic support to the lower lumbar-sacral region of the body. In a typical embodiment, the mounting apparatus includes a harness device that is worn by a rider. The harness device fits between the lower torso and upper thigh region of the body and has a projecting section attached to the rear.

When a rider mounts a bicycle or pedaled vehicle, the projecting section comes in contact with and is supported by means of an adapted bicycle mounting post, thus bearing the riders weight with the harness device leaving sub scrotal arteries free of pressure. However, even though the mounting apparatus can reduce the pubic/buttocks pressure, the pressure cannot be totally eliminated, so when the rider is on the bicycle for a long period of time, the rider may still feel uncomfortable due to the prolonged pressure on the public area.

U.S. Pat. No. 6,554,355 to Kaptur discloses a bicycle seat for a bicycle having a frame with a seat post. A seat base plate is mounted at the upper end of the seat post. Passenger supporting extensions are mounted pivotally on the base plate for limited angular displacement relative to a fore-and-aft centerline of the seat. A cushion member is supported on the base plate, a cushion with a rounded peripheral surface is secured to each extension, the cushion for the base plate having a rounded periphery that registers with the rounded surface of each cushion on the extensions. The cushion for the base plate has a rearward margin defining a shoulder providing a reaction location that accommodates rearward force reaction to forces applied by the right ilium and the left ilium of the pelvis of a bicycle rider. Each cushion for the extensions cooperates with the rounded periphery of the base plate cushion to form a crease that is positioned to receive an ischium extremity of the pelvis of a bicycle rider. The forces distributed to each ischium of the pelvis of a bicycle rider having a fore-and-aft component and a lateral component, thereby providing fore-and-aft stability and lateral stability for the bicycle rider. However, like Stevens, the cushion disclosed by Kaptur may not effectively reduce the pressure on the rider's pubic portion, so the rider may still feel uncomfortable when riding the bicycle for extended period of time. Therefore, there remains a need for a new and improved seating apparatus to overcome the problems stated above.

SUMMARY

It is an object of the present disclosure to provide a seating apparatus having a hollow supporting structure to provide the user a more comfortable and healthy seating environment.

It is another object of the present disclosure to provide a seating apparatus having a hollow supporting structure to provide the most effective support of the user's buttocks and totally eliminate the pressure on the user's pubic bone.

In one aspect, a seating apparatus may include a seating unit and a hollow supporting structure to provide a complete support of the user's buttocks and eliminate the pressure on the user's pubic bone. In one embodiment, the hollow supporting structure is a pair of bowl-shaped springs, which can be disposed underneath the seating unit to receive and support the buttocks of the user. More specifically, the buttocks of the user can be received in a concave surface of each hollow bowl-shaped spring so a complete support over a large area is provided to the user's buttocks and pubic bone to eliminate the pressure therefrom. Furthermore, the springs can also be used as cushions to absorb impact on the user's lower body portion.

In another aspect, a seating apparatus may include a seating unit and a hollow supporting structure to provide a complete support of the user's buttocks and eliminate the pressure on the user's pubic bone. In one embodiment, the hollow supporting structure can simply be a pair of rings, which can be disposed underneath a seating unit to receive and support the buttocks of the user. In another embodiment, the seating unit can include a regular seat, a stool, a bicycle seat, and even a horse saddle. Like the bowl-shaped spring, the buttocks of the user can be received in the rings, which are configured to provide a complete support over a larger area of the user's buttocks to eliminate the pressure on the pubic bone. In a further aspect, the hollow supporting structure may be a pair of concave cone-shaped units.

The disclosure is not limited for a seating apparatus for a two or a three-wheeled vehicles. Accordingly, one or more embodiments of the disclosure is presented.

A seating apparatus comprises of a first seating portion, a second seating portion and a joint weight bearing portion. The first seating portion comprises a first outer perimeter and a first inner perimeter, and a first surface is formed between the first outer perimeter and the first inner perimeter. The first outer perimeter is larger than the first inner perimeter such that the first surface slopes down at an angle greater than 0° and less than 90° from the first outer perimeter to the first inner perimeter.

The second seating portion has a second outer perimeter and a second inner perimeter, and a second surface is formed between the second outer perimeter and the second inner perimeter. The second outer perimeter is larger than the second inner perimeter such that the second surface slopes down at an angle greater than 0° and less than 90° from the second outer perimeter to the second inner perimeter. The first outer perimeter and the second outer perimeter do not come into direct contact to each other so that two separate seating portions are formed.

The first seating portion further comprises of a first post and the second seating portion further comprises of a second post, so that the first post and the second post support the first seating portion and the second seating portion, respectively. The first post and the second post are jointly held together at the joint weight bearing portion, lifting up the seating apparatus so that the first seating portion supports a first buttock and the second seating portion supports a second buttock of a person.

The seating apparatus may have each of the first seating portion and the second seating portion is padded for comfort, but it is not necessary as the sloping of the first surface and the second surface provides ample support comfortably.

As mentioned earlier, the first seating portion and the second seating portion may be one or more rings, one or more helical springs, and/or combination of plurality of rings formed as spring. In addition, it is possible to have first seating portion and the second seating portion having a shape of disks with central holes. For example, the first inner perimeter of the first seating portion forms a first hollow ring forming a disk with a hole about in the middle and the second inner perimeter of the second seating portion forms a second hollow ring forming a disk with a hole about in the middle. Also, it is possible to mix and match different seating portions to best provide the comfort of the user.

As a second embodiment, the first seating portion comprises of a first outer perimeter, a first inner perimeter and a first outermost perimeter. In between the first outermost perimeter and the first inner perimeter forms a first surface and the first outer perimeter is also located in-between the first outermost perimeter and the first inner perimeter.

The first outer perimeter is larger than the first inner perimeter such that the first surface slopes down. The angle of the first surface slope between the first outer perimeter to the first inner perimeter is greater than 0° and less than 90°.

Likewise, the second seating portion comprises of a second outer perimeter, a second inner perimeter and a second outermost perimeter. a first inner perimeter and a first outermost perimeter. In between the second outermost perimeter and the second inner perimeter forms a second surface and the second outer perimeter is also located in-between the second outermost perimeter and the second inner perimeter.

The second outer perimeter is larger than the second inner perimeter such that the second surface slopes down. The angle of the second surface slope between the second outer perimeter to the second inner perimeter is greater than 0° and less than 90°. In this embodiment, the first outermost perimeter and the second outermost perimeter do not come into direct contact to each other so that two separate seating portions are formed.

In a third embodiment, the first seating portion further comprises of a first inner loop placed under the first seating portion and the first inner loop is also attached to the first post, and the second seating portion further comprises of a second inner loop placed under the second seating portion and the second inner loop is attached to the second post. The first post and the second post support the first seating portion and the second seating portion, respectively, and the first post and the second post are jointly held together at the joint weight bearing portion.

It is possible to have the joint weight bearing portion comprises of a first side of the joint weight bearing portion and a second side of the joint weight bearing portion. The first post is attached to the first side of the joint weight bearing portion and the second post is attached to the second side of the joint weight bearing portion. The first side of the joint weight bearing portion may be independently rotatably adjustable from the second side of the joint weight bearing portion.

Additionally, a first plurality of prongs may be attached to the first loop and attached to the first post and a second plurality of prongs attached to the second loop and attached to the second post. The first loop starts from one of the first plurality of prongs and ends with another of the first plurality of prongs, and the second loop starts from one of the second plurality of prongs and ends with another of the second plurality of prongs.

Although the embodiments are described with certain components, sometime specific to a particular embodiment, it is envisioned that each component of the seating apparatus is interchangeable among different embodiments. For example, each embodiment may have padded cushions on the one or more seating portions.

BRIEF DESCRIPTION OF THE DRAWINGS

FIGS. 8a, 8b, 8c and 8d illustrate another aspect of the seating apparatus.

DETAILED DESCRIPTION OF THE INVENTION

Figure 1:
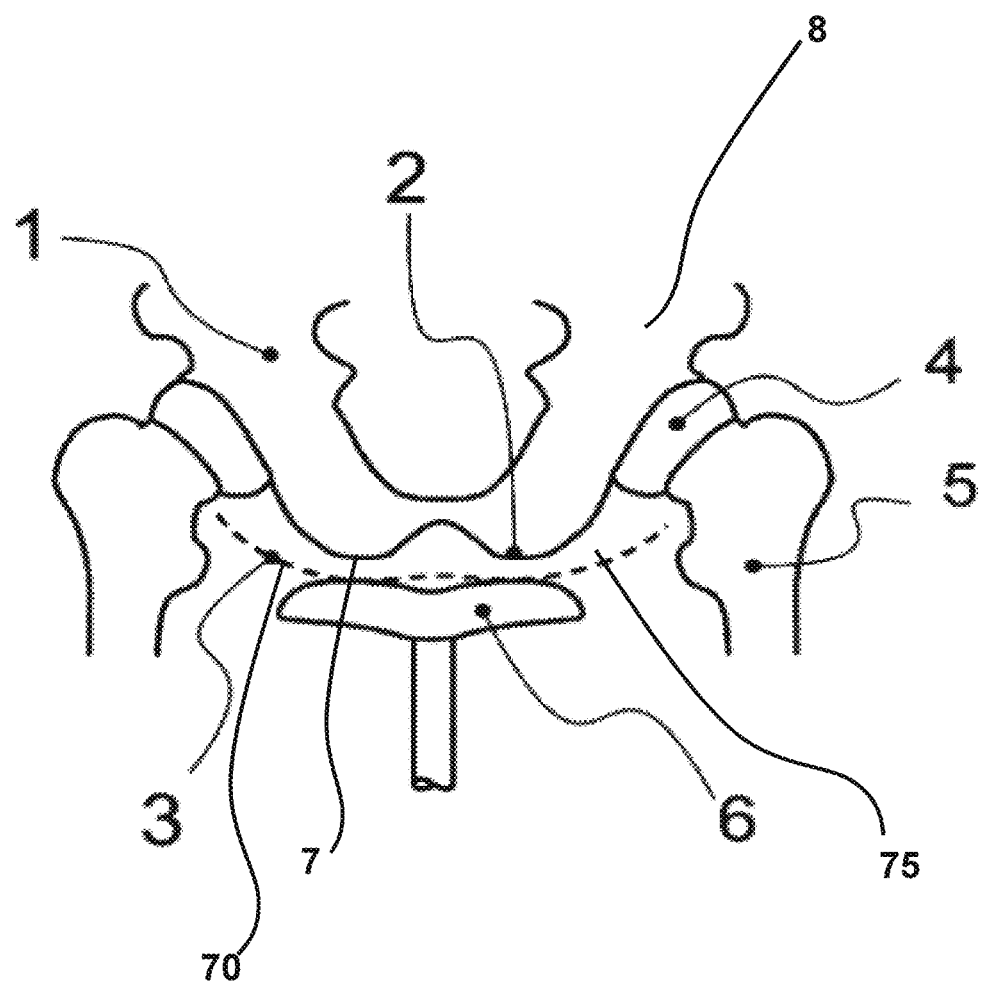
FIG. 1 illustrates a prior art disclosing an anatomic view of a cyclist in a sitting position on a standard bicycle seat.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of ""a"", ""an"", and ""the"" includes reference to the plural unless the context clearly dictates otherwise. Also, as used in the description herein and throughout the claims that follow, the terms ""comprise or comprising"", ""include or including"", ""have or having"", ""contain or containing"" and the like are to be understood to be open-ended, i.e., to mean including but not limited to. As used in the description herein and throughout the claims that follow, the meaning of ""in"" includes ""in"" and ""on"" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term ""and/or"" includes any and all combinations of one or more of the associated listed items.

It will be understood that when an element is referred to as being ""connected"" or ""coupled"" to another element, it can be directly connected or coupled to the other element or intervening elements may be present. In contrast, when an element is referred to as being ""directly connected"" or ""directly coupled"" to another element, there are no intervening elements present.

In order to further understand the goal, characteristics and effect of the present invention, a number of embodiments along with the drawings are illustrated as following:

FIG. 1 shows an anatomic view of a cyclist in a sitting position on a standard bicycle seat. The body of the rider, as depicted by the hip bone structure shown with an ilium 1 and ischium 2 with lower buttocks 3 and femoral heads 4 with femurs 5. When the rider sits on a seat 6, his lower buttocks 3 provide a cushion between his ischium 2 and the seat 6. The pressure of the body weight on the ischium 2 (both on the left ischium and the right ischium) as seen in FIG. 1, is concentrated on the lower tips 7 of the ischium 2 and felt by the user. This is especially true when the user sits on the seat 6 for a long time or as the user becomes older and the muscles surrounding the ischium become weaker, the user can feel the weight of the body on the ischium 2 against the seat 6. Even with a substantial amount of cushion on the seat 6, sitting over an extended period can be quite uncomfortable and even painful.

Figure 2:
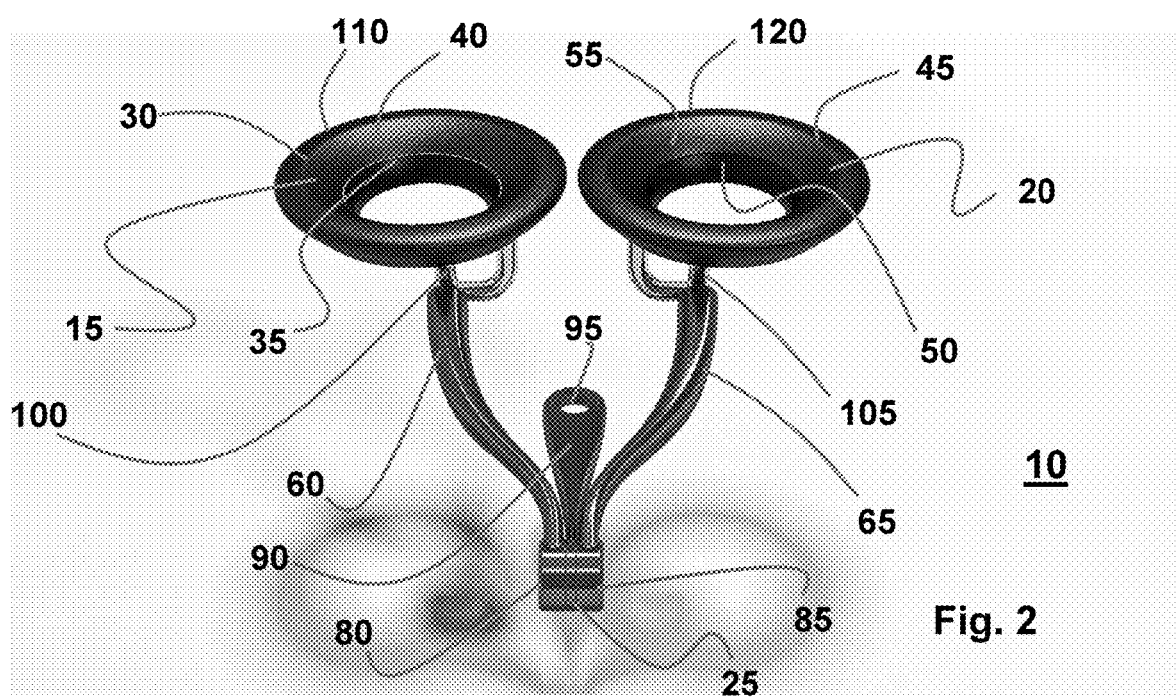
FIG. 2 illustrates a one aspect of the seating apparatus.

FIG. 2 shows a seating apparatus 10 and it has a first seating portion 15, a second seating portion 20 and a joint weight bearing portion 25. The first seating portion 15 comprises a first outer perimeter 30 and a first inner perimeter 35, and a first surface 40 is formed between the first outer perimeter 30 and the first inner perimeter 35. The first outer perimeter 30 is larger than the first inner perimeter 35 such that the first surface slopes down at an angle greater than 0° and less than 90° from the first outer perimeter 30 to the first inner perimeter 35. That is, the first surface 40 slopes down from the first outer perimeter 30 to the first inner perimeter 35 located inside the first outer perimeter 30. The first inner perimeter 35 is placed lower than the first outer perimeter 30 (that is, closer to the joint weight bearing portion 25), so that the first surface 40 is concave surface. The first seating portion 15 is design to have one of the lower buttocks 3 of the user 8 placed on it with the lower tip 7 of an ischium 2 placed on it.

The second seating portion 20 comprises a second outer perimeter 45 and a second inner perimeter 50, and a second surface 55 is formed between the second outer perimeter 45 and the second inner perimeter 50. The second outer perimeter 45 is larger than the second inner perimeter 50 such that the second surface slopes down at an angle greater than 0° and less than 90° from the second outer perimeter 45 to the second inner perimeter 50. That is, the second surface 55 slopes down from the second outer perimeter 45 to the second inner perimeter 50 located inside the second outer perimeter 45. The second inner perimeter 50 is placed lower than the second outer perimeter (that is, closer to the joint weight bearing portion 25), so that the second surface 55 is concave surface. The second seating portion 20 is design to have one of the lower buttocks 3 of the user 8 placed on it with the lower tip 7 of an ischium 2 placed on it.

The embodiment is that the first seating portion 15 and the second seating portion 20 are separately supported from the joint weight bearing portion 25. Thus, the first outer perimeter 30 and the second outer perimeter 45 do not come into direct contact to each other so that two distinctively separate seating portions are formed.

As seen in FIG. 2, the first seating portion 15 further comprises of a first post 60 and the second seating portion 20 further comprises of a second post 65, so that the first post the second post 65 support the first seating portion 15 and the second seating portion 20, respectively. The first post 60 and the second post 65 are jointly held up together at the joint weight bearing portion 25, lifting up the seating apparatus 10 so that the first seating portion 15 supports a first buttock 70 and the second seating portion 20 supports a second buttock 75 of a person (the first buttock 70 and the second buttock 75 are shown in FIG. 1).

The seating apparatus 10 may have each of the first seating portion 15 and the second seating portion 20 is padded for comfort, but it is not necessary as the sloping of the first surface 40 and the second surface 55 provides ample support comfortably.

In FIG. 2, the joint weight bearing portion 25 comprises of a first side 80 of the joint weight bearing portion 25 and a second side 85 of the joint weight bearing portion 25. The first post 60 is attached to the first side 80 of the joint weight bearing portion 25 and the second post 65 is attached to the second side 85 of the joint weight bearing portion 25. The first side 80 of the joint weight bearing portion 25 may be independently rotatably adjustably fixed to the second side 85 of the joint weight bearing portion 25. Moreover, a mounting portion 90 with a mounting hole 95 may be attached to the joint weight bearing portion 25. However, the depiction of the mounting portion 90 with the mounting hole 95 does not limit the various mounting means available to mount the seating apparatus 10 to a chair, a bicycle frame, a vehicle frame or other related seating apparatus.

FIG. 2 also shows a first plurality of prongs 100 and a second plurality of prongs 105 that are used to connect the first seating portion 15 and the second seating portion 20 to the first post 60 and the second post 65, respectively.

Figure 3:
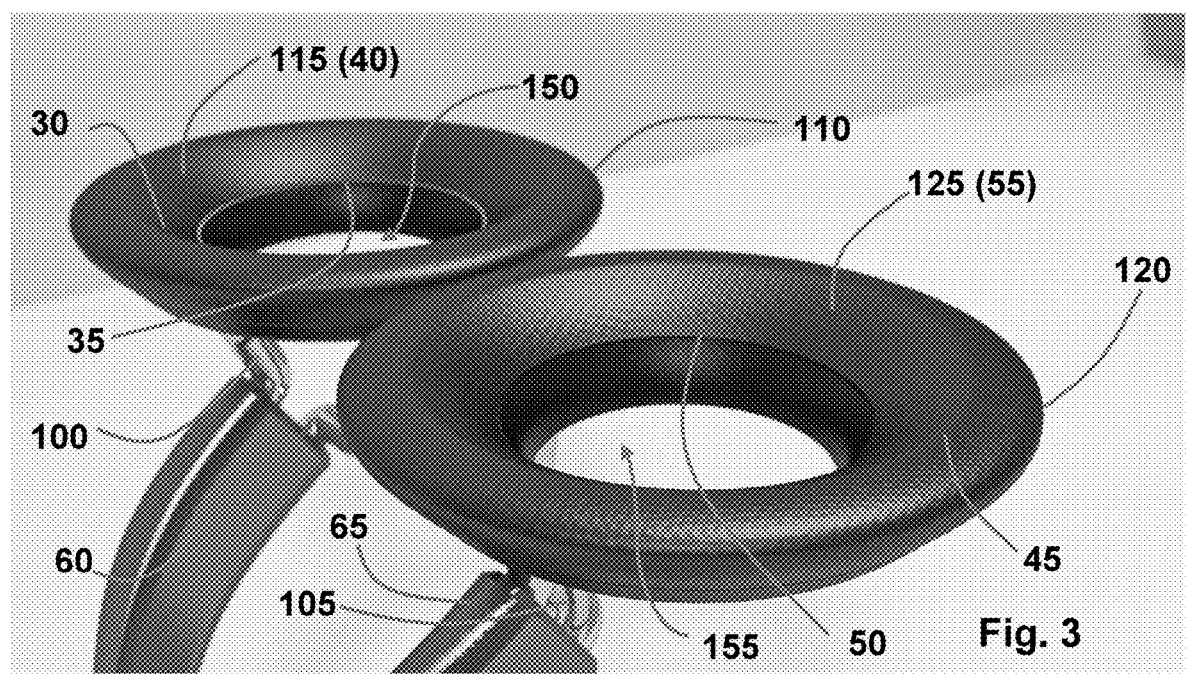
FIG. 3 illustrates another aspect of the seating apparatus.

FIG. 3 shows an enlarged perspective view of the first seating portion 15 and the second seating portion 20. In FIG. 3, more detailed description of the seating apparatus 10 may be made.

The first seating portion 15 shows a first outer perimeter 30, a first inner perimeter 35 and a first outermost perimeter 110. In between the first outermost perimeter 110 and the first inner perimeter 35 forms a first surface 115 (40). Also, the first outer perimeter 30 is located in between the first outermost perimeter 110 and the first inner perimeter 35.

The first outermost perimeter 110 is large than the first outer perimeter 30, and the first outer perimeter 30 is larger than the first inner perimeter 35. The first surface 115 (40) slopes down between the first outer perimeter 30 and the first inner perimeter 35. The angle of the first surface 115 (40) sloping down between the first outer perimeter 30 and the first inner perimeter 35 is greater than 0° and less than 90°. As it is illustrated in FIG. 3, there is no requirement for a sloping surface between the first outermost perimeter 110 and the first outer perimeter 30. Therefore, the surface between the first outermost perimeter 110 and the first outer perimeter 30 may be flat or even have slope that is going down from the first outer perimeter 30 to the first outermost perimeter 110. In addition, the sloping of the first surface 115 (40) in any configuration may be gradual, having a curved shape, as in a shape of a doughnut or a ring.

Likewise, the second seating portion 20 shows a second outer perimeter 45, a second inner perimeter 50 and a second outermost perimeter 120. In between the second outermost perimeter 120 and the second inner perimeter 50 forms a second surface 125 (55). Also, the second outer perimeter 45 is located in between the second outermost perimeter 120 and the second inner perimeter 50.

The second outermost perimeter 120 is large than the second outer perimeter 45, and the second outer perimeter 45 is larger than the second inner perimeter 50. The second surface 125 (55) slopes down between the second outer perimeter 45 and the second inner perimeter 50. The angle of the second surface 125 (55) sloping down between the second outer perimeter 45 and the second inner perimeter 50 is greater than 0° and less than 90°. As it is illustrated in FIG. 3, there is no requirement for a sloping surface between the second outermost perimeter 120 and the second outer perimeter 45. Therefore, the surface between the second outermost perimeter 120 and the second outer perimeter 45 may be flat or may even have slope that is going down from the second outer perimeter 45 to the second outermost perimeter 120. In addition, the sloping of the second surface 125 (55) in any configuration may be gradual, having a curved shape, as in a shape of a doughnut or a ring.

In this embodiment, the first outermost perimeter 110 and the second outermost perimeter 120 do not come into direct contact to each other so that two separate seating portions are formed.

Figure 4:
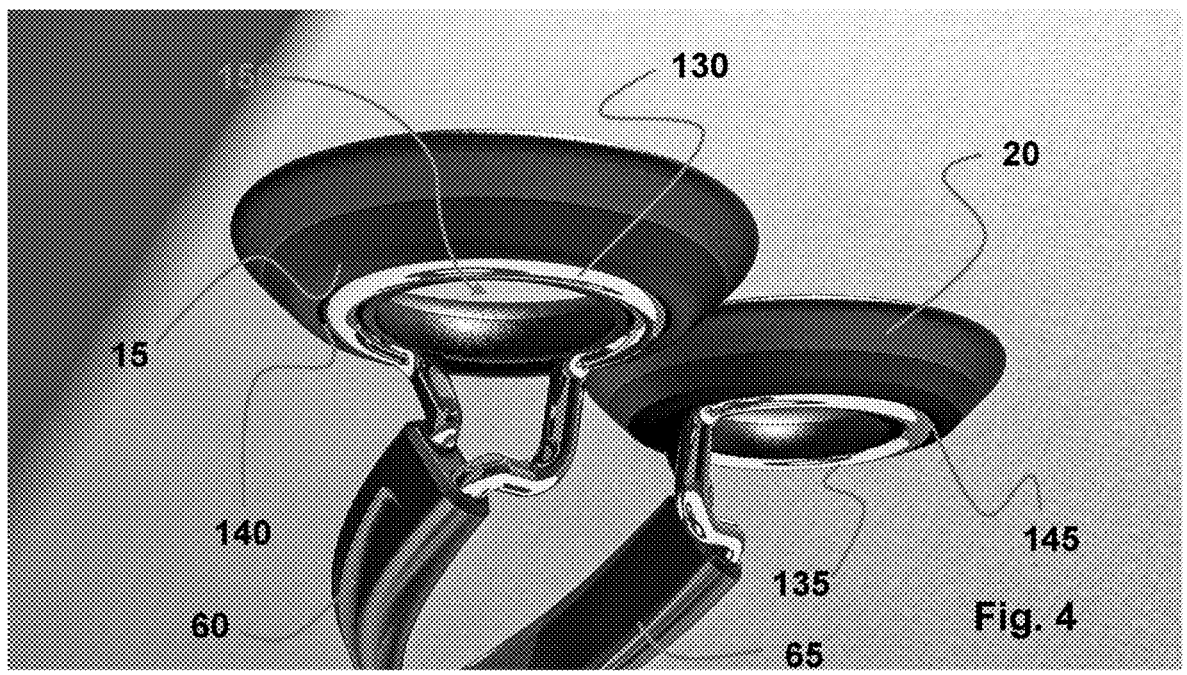
FIG. 4 illustrates another aspect of the seating apparatus.
Figure 5:
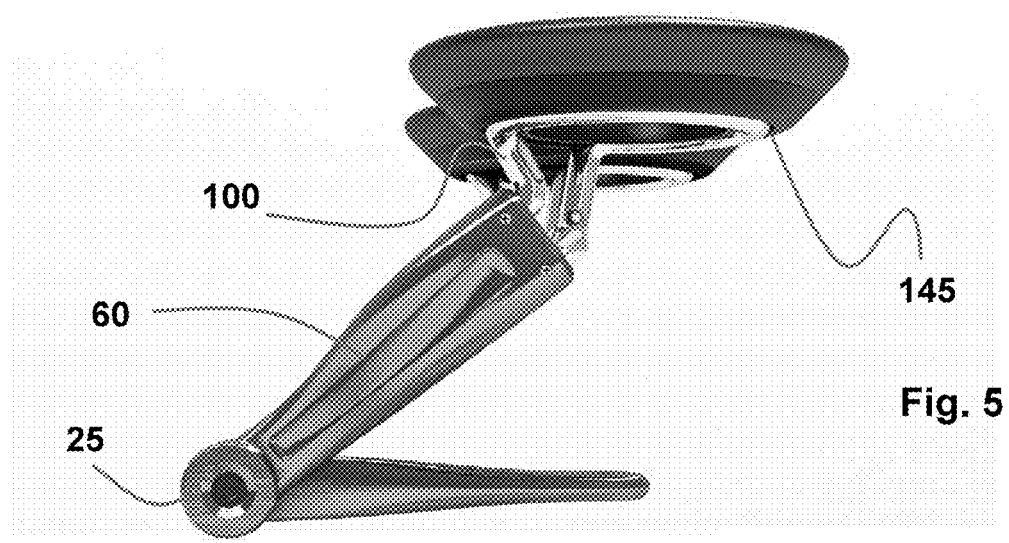
FIG. 5 illustrates another aspect of the seating apparatus.
Figure 6:
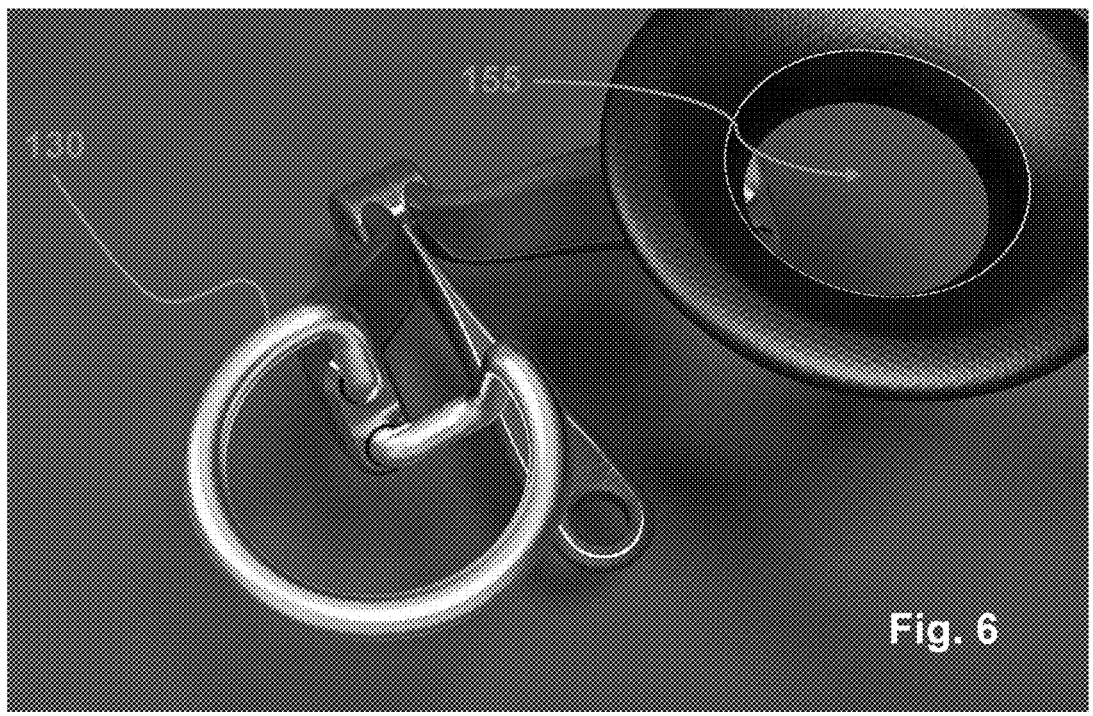
FIG. 6 illustrates another aspect of the seating apparatus.

FIGS. 4 and 5 show different perspective view of the seating apparatus. FIGS. 4-6 illustrate the first seating portion 15 further comprises of a first inner loop 130 placed under the first seating portion 15 and the first inner loop 130 is also attached to the first post 60, and the second seating portion 20 further comprises of a second inner loop 135 placed under the second seating portion 20 and the second inner loop 135 is attached to the second post.

It is possible to have the first inner loop 130 imbedded inside the first seating portion 15 or the first inner loop 130 be inserted into the first seating portion 15 with the first seating portion 15 having a groove 140 or a cutout 145 to receive the first inner loop 130. Likewise, it is possible to have the second inner loop 135 imbedded inside the second seating portion 20 or the second inner loop 135 be inserted into the second seating portion 20 with the second seating portion 20 having a groove 140 or a cutout 145 to receive the second inner loop 135.

FIGS. 4-6 also shows that the first inner perimeter 35 of the first seating portion 15 forms a first hollow ring 150 and the second inner perimeter 50 of the second seating portion 20 forms a second hollow ring 155, wherein the first hollow 150 ring and the second hollow ring 155 are located at about the middle of the first seating portion 15 and the second seating portion 20, respectively.

The first post 60 and the second post 65 support the first seating portion 15 and the second seating portion 20, respectively, and the first post 60 and the second post 65 are jointly held together at the joint weight bearing portion 25. Additionally, a first plurality of prongs 100 may be attached to the first loop 130 and attached to the first post 60 and a second plurality of prongs 105 attached to the second loop 135 and attached to the second post 65. The first loop starts 130 from one of the first plurality of prongs 100 and ends with another prong of the first plurality of prongs 100, and the second loop 135 starts from one of the second plurality of prongs 105 and ends with another of the second plurality of prongs 105.

Figure 7:
FIG. 7 illustrates another aspect of the seating apparatus.
Figure 9:
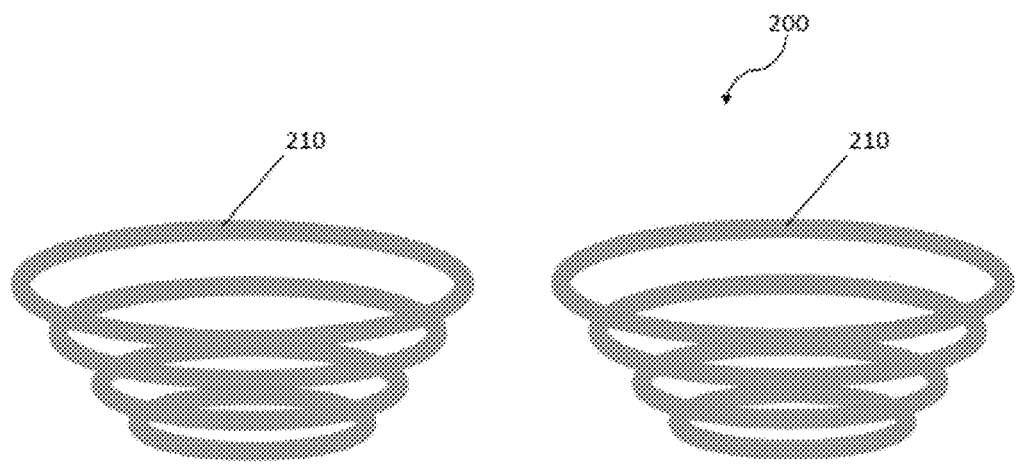
FIG. 9 illustrates a pair of helically wound springs, and alternately illustrates a set of rings forming a respective spring used for seating portions.

As shown in FIG. 7 (also in FIG. 1), it is possible to have the joint weight bearing portion 25 comprises of a first side 80 of the joint weight bearing portion 25 and a second side 85 of the joint weight bearing portion 25. The first post 60 is attached to the first side 80 of the joint weight bearing portion 25 and the second post 65 is attached to the second side 85 of the joint weight bearing portion 25. The first side 80 of the joint weight bearing portion 25 may be independently rotatably adjustable from the second side 85 of the joint weight bearing portion 25.

FIG. 8 (FIGS. 8a, 8b, 8c and 8d) shows that the first post 60 and the second post 65 may be attached to the joint weight bearing portion 25. When the first post 60 and the second post 65 are rotatably attached to the joint weight bearing portion 25, each of the first post 60 and the second post 65 may be independently supported, moving up and down according to the motion of the buttocks 3 of the user 8. Each of the first post 60 and the second post 65 may be independently supported, as shown in FIG. 8, by two springs 66, 67 attached to the mounting portion 90; ideal for mounting the seating apparatus on a vehicle such as a bicycle.

As a part of various options, the first seating portion 15 and the second seating portion 20 may be one or more rings 200, one or more helical springs 210, and/or combination of plurality of rings formed as spring 210. In addition, it is possible to have first seating portion 15 and the second seating portion 20 having a shape of disks with central holes 155 (as seen in FIG. 6). For example, the first inner perimeter 35 of the first seating portion 15 forms a first hollow ring 155 forming a disk with the hollow hole 155 about in the middle and the second inner perimeter 50 of the second seating portion 20 forms a second hollow ring 155 forming a disk with the hollow hole 155 about in the middle.

Figure 10:
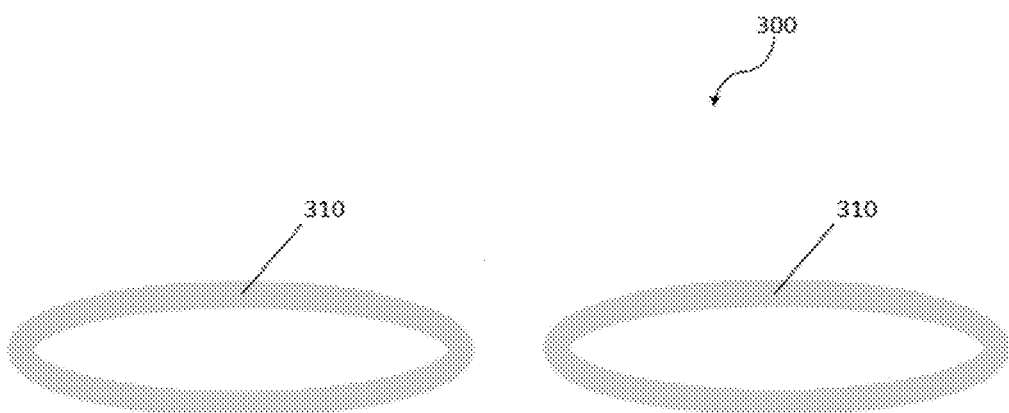
FIG. 10 illustrates a pair of rings used for seating portions.
Figure 11:
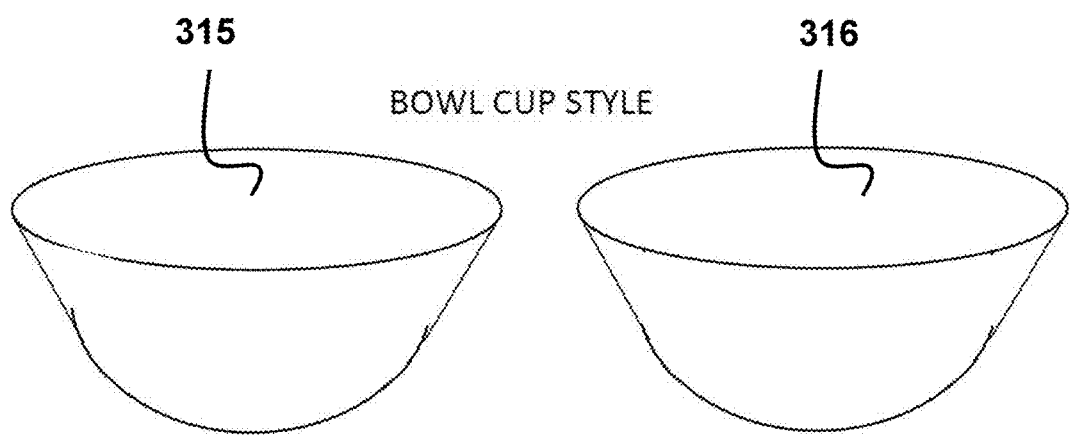
FIG. 11 illustrates a pair of bowls or a pair of cups used for seating portions.
Figure 12:
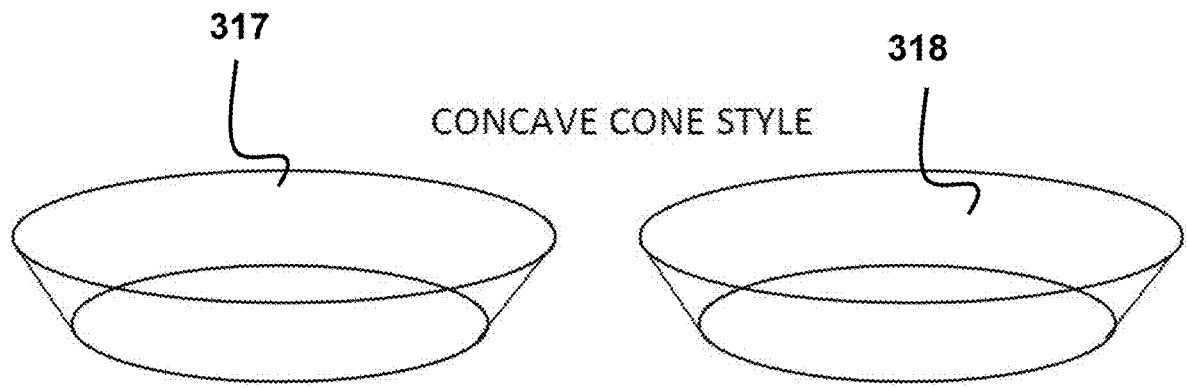
FIG. 12 illustrates a pair of concave cone style used for seating portions.

FIGS. 10-12 illustrate various design for the first seating provision 15 and the second provision 20, including but not limited to use of a single ring 310, a bowl 315, a cup 316, a concave cone 317 and a concave conically shaped ring 318 with an opening in the middle for each of the first seating provision 15 and the second provision 20. It is possible to mix and match differently shaped seating portions, different embodiments, to best provide the comfort of the user.

Comparing with conventional seating apparatus used to reduce the pubic/buttocks pressure, the present disclosure is advantageous because the hollow supporting structure can provide the most significant support of the user's buttocks and eliminate the pressure on the user's pubic bone, especially on the ischium. For example, the buttocks of the user can be received in a concave surface of each hollow supporting structure over a large area of the user's buttocks and pubic bone to totally eliminate the pressure therefrom, so user (for example, a rider of the bicycle) may not feel uncomfortable with the seating apparatus disclosed herein, even riding the bicycle for a long period of time.

While various embodiments have been shown and described, it will be appreciated by those skilled in the art that variations in form, detail, compositions and operation may be made without departing from the spirit and scope of the invention. Thus, the specification and the embodiments presented herein do not limit the scope of the invention, but only illustrate the best mode at the time of this application and possible potentials of the invention. Therefore, the claims presented shall be interpreted to the full scope afforded by law.

Figure 13:
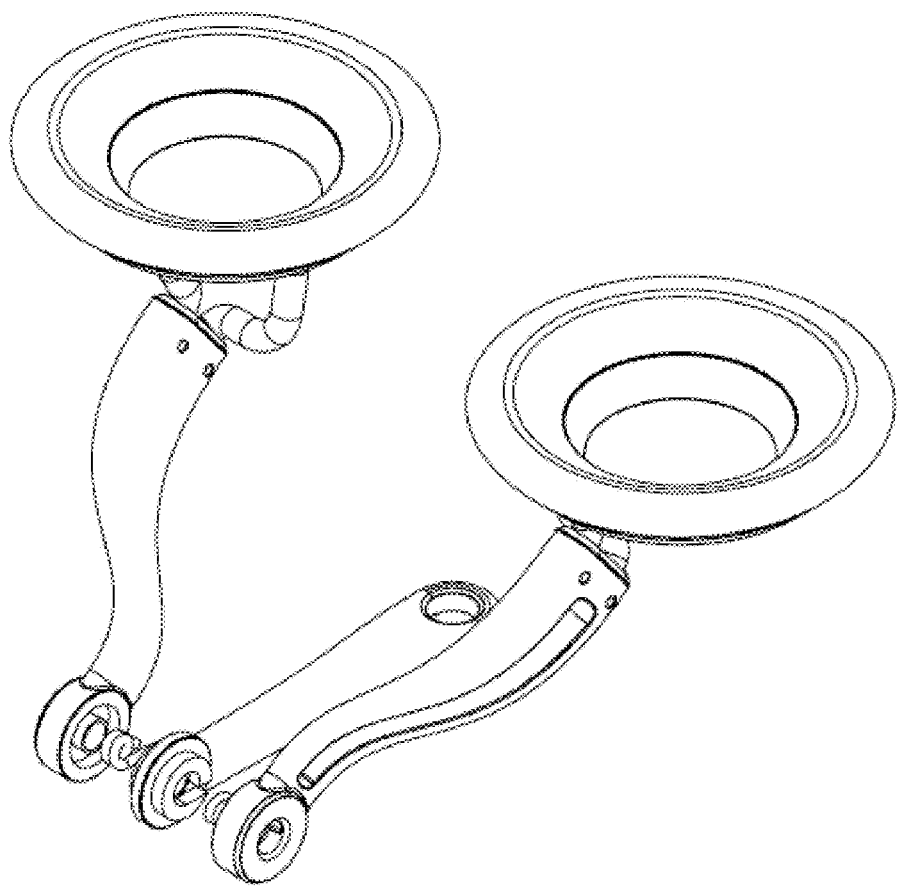
FIG. 13 illustrates another aspect of the seating apparatus.

For example, FIG. 13 shows another aspect of the seating apparatus with each of the first post and the second post may be independently supported, with two springs placed within the joint weight bearing portion; ideal for mounting the seating apparatus on a vehicle such as a bicycle.

As another example, each of the first seating portion and the second seating portion may be a ring, including but not limited to a circular ring, an oval ring, a polygon shaped ring or a round-edged polygon shaped ring. Also, each of the first seating portion and the second seating portion may be a cup, including but not limited to a circular cup, an oval cup, a polygon shaped cup or a round-edged polygon shaped cup. In addition, each of the first seating portion and the second seating portion may be a helically wound spring having a circular shape, an oval shape, a polygon shape or a round-edged polygon shaped end.

What is claimed is:

1. A seating apparatus comprising a first seating portion, a second seating portion and a joint weight bearing portion;
    wherein the first seating portion has a first groove and the first seating portion comprising a first outer perimeter and a first inner perimeter, wherein a first surface is formed between the first outer perimeter and the first inner perimeter, and wherein the first outer perimeter is larger than the first inner perimeter such that the first surface slopes down at an angle greater than 0° and less than 90° from the first outer perimeter to the first inner perimeter;
    wherein the second seating portion has a second groove and the second seating portion comprising a second outer perimeter and a second inner perimeter, wherein a second surface is formed between the second outer perimeter and the second inner perimeter, and wherein the second outer perimeter is larger than the second inner perimeter such that the second surface slopes down at an angle greater than 0° and less than 90° from the second outer perimeter to the second inner perimeter;
    wherein the first outer perimeter and the second outer perimeter do not come into direct contact to each other;
    wherein the first seating portion further comprising a first post inserted into the first groove and the second seating portion further comprising a second post inserted into the groove, wherein the first post and the second post support the first seating portion and the second seating portion, respectively, and wherein the first post and the second post are jointly held together at the joint weight bearing portion; and
    wherein the first seating portion supports a first buttock and the second seating portion supports a second buttock of a person.

2. The seating apparatus of claim 1 wherein each of the first seating portion and the second seating portion is padded for comfort.

3. The seating apparatus of claim 1 wherein the first seating portion is a first ring and the second seating portion is a second ring.

4. The seating apparatus of claim 1 wherein the first seating portion is a first helical spring and the second seating portion is a second helical spring.

5. The seating apparatus of claim 1 wherein the first seating portion is a first plurality of rings formed into a first spring and the second seating portion is a second plurality of rings formed into a second spring.

6. The seating apparatus of claim 1 wherein the first inner perimeter of the first seating portion forms a first hollow ring and the second inner perimeter of the second seating portion forms a second hollow ring, wherein the first hollow ring and the second hollow ring are located at the middle of the first seating portion and the second seating portion, respectively.

7. The seating apparatus of claim 1 wherein either or both of the first surface of the first seating portion and the second surface of the second seating portion is shaped as a bowl.

8. The seating apparatus of claim 1 wherein the joint weight bearing portion has a first side of the joint weight bearing portion and a second side of the joint weight bearing portion, wherein the first post is attached to the first side of the joint weight bearing portion and the second post is attached to the second side of the joint weight bearing portion.

9. The seating apparatus of claim 1 wherein the first side of the joint weight bearing portion may be independently rotatably adjustable from the second side of the joint weight bearing portion.

10. The seating apparatus of claim 1 wherein the first inner perimeter of the first seating portion forms a first hollow ring and the second inner perimeter of the second seating portion forms a second hollow ring, wherein the first hollow ring and the second hollow ring are located at the middle of the first seating portion and the second seating portion, respectively.

11. The seating apparatus of claim 10 wherein a first plurality of prongs attached to the first loop and attached to the first post and a second plurality of prongs attached to the second loop and attached to the second post.

12. A seating apparatus comprising a first seating portion, a second seating portion and a joint weight bearing portion;
    wherein the first seating portion has a first groove and the first seating portion comprising a first outer perimeter, a first inner perimeter and a first outermost perimeter, wherein a first surface is formed between the first outermost perimeter and the first inner perimeter, wherein the first outer perimeter is located in-between the first outermost perimeter and the first inner perimeter, and wherein the first outer perimeter is larger than the first inner perimeter such that the first surface slopes down at an angle greater than 0° and less than 90° from the first outer perimeter to the first inner perimeter;

wherein the second seating portion has a second groove and the second seating portion comprising a second outer perimeter, a second inner perimeter and a second outermost perimeter, wherein a second surface is formed between the second outermost perimeter and the second inner perimeter, wherein the second outer perimeter is located in-between the second outermost perimeter, and wherein the second inner perimeter and the second outer perimeter is larger than the second inner perimeter such that the second surface slopes down at an angle greater than 0° and less than 90° from the second outer perimeter to the second inner perimeter;

wherein the first outermost perimeter and the second outermost perimeter do not come into direct contact to each other;

wherein the first seating portion further comprising a first loop placed under the first seating portion and placed in the first groove wherein the first loop is attached to the first post, and wherein the second seating portion further comprising a second loop placed under the second seating portion and placed in the second groove wherein the second loop is attached to the second post, wherein the first post and the second post support the first seating portion and the second seating portion, respectively, and wherein the first post and the second post are jointly held together at the joint weight bearing portion; and wherein the first seating portion supports a first buttock and the second seating portion supports a second buttock of a person.

13. The seating apparatus of claim 12 wherein the joint weight bearing portion has a first side of the joint weight bearing portion and a second side of the joint weight bearing portion, wherein the first post is attached to the first side of the joint weight bearing portion and the second post is attached to the second side of the joint weight bearing portion.

14. The seating apparatus of claim 13 wherein the first side of the joint weight bearing portion may be independently rotatably adjustable from the second side of the joint weight bearing portion.

15. The seating apparatus of claim 13 wherein the first inner perimeter of the first seating portion forms a first hollow ring and the second inner perimeter of the second seating portion forms a second hollow ring, wherein the first hollow ring and the second hollow ring are located at the middle of the first seating portion and the second seating portion, respectively.

16. The seating apparatus of claim 12 wherein each of the first seating portion and the second seating portion is padded for comfort.

17. The seating apparatus of claim 12 wherein the first seating portion is a first plurality of rings formed into a first spring and the second seating portion is a second plurality of rings formed into a second spring.

18. The seating apparatus of claim 12 wherein the first inner perimeter of the first seating portion forms a first hollow ring and the second inner perimeter of the second seating portion forms a second hollow ring, wherein the first hollow ring and the second hollow ring are located at the middle of the first seating portion and the second seating portion, respectively.

19. The seating apparatus of claim 12 wherein either or both of the first surface of the first seating portion and the second surface of the second seating portion is shaped as a bowl.

20. The seating apparatus of claim 12 wherein the first loop placed in the first groove is partially imbedded in the first groove and the second loop placed in the second groove is partially imbedded in the second groove.

* * * * *